United States Patent [19]
Mt. Pleasant, III

[11] 3,717,694
[45] Feb. 20, 1973

[54] HOT PRESSING A REFRACTORY ARTICLE OF COMPLEX SHAPE IN A MOLD OF SIMPLE SHAPE

[75] Inventor: Edison P. Mt. Pleasant, III, Lewiston, N.Y.

[73] Assignee: The Carborundum Company, Niagara Falls, N.Y.

[22] Filed: Nov. 9, 1970

[21] Appl. No.: 87,674

[52] U.S. Cl. ............264/67, 264/294, 264/332, 264/337
[51] Int. Cl. ..................C04b 35/64, B22f 3/14
[58] Field of Search........264/125, 67, 294, 332, 337; 75/226

[56] References Cited

UNITED STATES PATENTS

| | | | |
|---|---|---|---|
| 3,589,880 | 6/1971 | Clark | 264/332 |
| 3,440,312 | 4/1969 | Alliegro | 264/332 |
| 3,456,048 | 7/1969 | Brandmayr | 264/65 |
| 3,535,132 | 10/1970 | Lunde | 264/332 |
| 3,455,682 | 7/1969 | Barbaras | 75/226 |
| 3,284,195 | 11/1966 | Googin et al. | 75/226 |

*Primary Examiner*—Julius Frome
*Assistant Examiner*—John H. Miller
*Attorney*—K. W. Brownell

[57] ABSTRACT

In a method for making various hot pressed shapes using simple mold or die forms, a simple compacted refractory form is machined to a desired shape with the removal of a part. The desired shape and part are reassembled with the distribution of a parting agent therebetween within a mold so as to substantially conform to the configuration of the mold. After hot pressing the shape and part, the desired shape is removed.

7 Claims, 7 Drawing Figures

PATENTED FEB 20 1973  3,717,694

INVENTOR.
EDISON P. MT. PLEASANT III
BY
R.E.W. Brownell

HOT PRESSING A REFRACTORY ARTICLE OF COMPLEX SHAPE IN A MOLD OF SIMPLE SHAPE

BACKGROUND OF THE INVENTION

Many refractory materials, such as hard metal refractory carbides and borides, are used for high temperature, high strength and wear resistant applications such as cutting edges and drills for machining high strength alloys, turbine blades, buckets, vanes and parts for rockets and missiles.

The fabrication of these refractory materials into the desired shapes has been done by powdered metallurgical techniques, such as slip casting, extruding or cold pressing followed by firing or sintering, or hot pressing wherein the compacting and pressing is accomplished simultaneously with the firing or sintering step.

Hot pressing is a preferred process since it can yield completely dense products whereas sintered products often contain residual porosity. In hot pressing methods a powder or compacted sample is pressed and heated in a close fitting, rigid mold or isostatically hot pressed in a sealed deformable container utilizing a fluid as the pressure transmitting medium. In both of these methods the sample assumes the shape of the mold or deformed container.

The sizes and shapes of the articles than can be produced in this manner are limited. Complex dies having indentations, holes, and ridges are not only expensive to mill but wear out rapidly. They often are not of sufficient strength to withstand hot pressing. The deformation of the powder or compacted shape that occurs in hot pressing also seriously limits the possible shapes of the final article. Heretofore, the shape of the final article is hot pressing was limited by the shape of the mold.

SUMMARY OF THE INVENTION

Accordingly, it is an object of the present invention to provide a new and improved method for producing a variety of articles from a single mold form.

Other and further objects of the present invention will become apparent from the following description.

In accordance with the present invention, it has been found that densified shapes of refractory materials may be produced by compacting refractory powders into a form, fabricating said form into a desired shape with the removal of a part, reassembling said shape and said part with the distribution of a parting agent therebetween within a mold so as to substantially conform to the configuration of the mold, compressing and heating the shape and part, and separating said part from said desired shape.

DETAILED DESCRIPTION OF THE PRESENT INVENTION

The present invention uses a starting powder or grains of a refractory material which produces hard metal carbides or borides. These carbides or borides include boron carbide, tungsten carbide, tungsten boride, silicon carbide, titanium carbide, vanadium carbide, titanium boride, vanadium boride, chromium carbide, chromium boride, niobium carbide, niobium boride, molybdenum carbide and molybdenum boride and mixtures thereof. Preferably silicon carbide or boron carbide or mixtures thereof are used. These carbides and borides generally constitute the major components in the finished bodies, but other refractory materials such as other carbides, borides, oxides, nitrides or silicides, can be present in minor amounts.

The starting powder or grains used in the process of the present invention preferably has a mesh size less than 200 mesh, U.S. standard screen size. This generally results in particle sizes less than about 50 microns. The refractory material may be sized by crushing to the proper size in a ball mill or by other conventional methods. Relatively larger grain sizes may be employed but will necessarily require higher forming pressures and higher temperatures for satisfactory densification.

The powders are mixed with a suitable binder selected to impart sufficient strength to permit machining of the compacted and cold pressed shape. Illustrative of the binders that are used in the process of the present invention are acetates, waxes, dextrine, pitches and resins. The binder can be curable or non-curable, and it is generally a solution or mixture including water or an organic solvent. The binder is mixed with the refractory powder so as to form a wetted composition which easily packs into a mold.

A steel mold is typically used for cold pressing or compacting the powders and is generally of a simple shape such as a square, hexagon, circle or triangle. The powder in the mold is preferably compacted at a pressure of about 50 pounds per square inch to about 500 pounds per square inch; the temperature during compacting is preferably maintained below 500° centigrade. Higher temperatures and pressures are generally undesirable since they tend to cause the powders to self-bond and reduce the effectiveness of the binder thereby unfavorably altering the machining properties of the cold pressed form.

Figure 1:
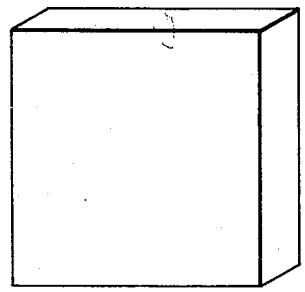
FIG. 1 is a perspective of a simple square form after compacting the refractory powder.

After compacting, the resulting form is placed in an oven for a sufficient period of time and at a sufficient temperature to remove excess water or organic solvent in the binder solution and cure the binder if a curable binder is used. The drying is generally accomplished by evenly flowing dry air at a specified temperature over the surface of the form. A plate that has been processed in this manner and is ready for machining is shown in FIG. 1.

The resulting forms are of sufficient strength to permit shaping with tools such as core drills, table saws, hacksaws, lathes or abrasive cutting discs which are commonly used for green machining. The form at this time is worked into its essentially final shape or desired shape to reduce the necessity of later machining the densified article. Parts that are cut away or removed from the cured form by machining are saved for subsequent use.

Figure 2:
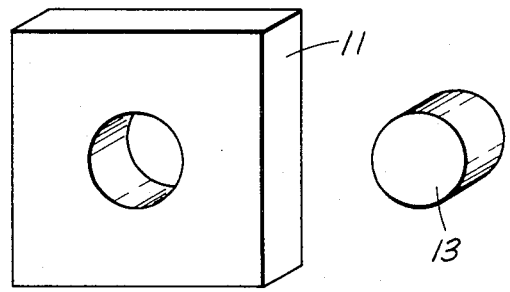
FIG. 2 is a perspective of a bored square and core after curing and shaping the simple form of FIG. 1 to produce a more complex shape.
Figure 5:
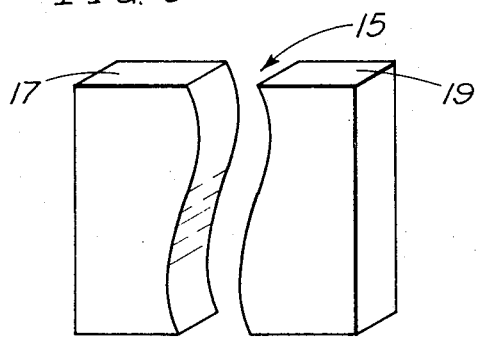
FIG. 5 is a perspective of a refractory compact cut into two irregular pieces.
Figure 6:
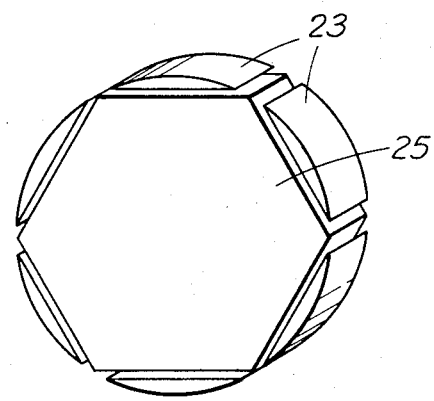
FIG. 6 is a perspective of a hexagon compacted shape with parts reassembled to form a circular assembly.

FIG. 2 shows a cured plate 11 that has been core drilled and the core 13 removed and saved. FIG. 5 illustrates a rectangular plate which was shaped with a hacksaw and has an irregular cut 15 separating the plate into a part 17 and a part 19. Each part has a More complicated shape than the original rectangular form. FIG. 6 illustrates a circular cured plate which has cords 23 cut therefrom with a hacksaw to form a final hexagon shape 25.

The compacted shape is introduced into a rigid mold cavity having a different and usually simpler shape than the final compacted shape placed therein. A parting agent is employed to cover exposed surfaces of the final shape. A part that has been cut away from the shape in green machining is arranged in the mold cavity adjacent to the final shape with a parting agent disposed therebetween. In this manner, a reassembled part and shape which is usually of a simpler shape than the final shape is pieced together in the mold using the parts removed in green machining and a parting agent as filler. The part and shape essentially conforms to the configuration of the mold. By the method of the present invention, a single mold may be used to obtain a variety of shapes.

Figure 3:
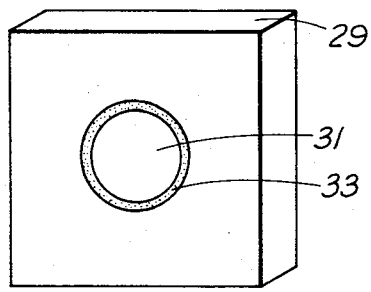
FIG. 3 is a perspective of the bored square of FIG. 2 with the core replaced to form as assembled part and shape.

FIG. 3 illustrates a square plate 29 with a hole bored therein and core 31 as assembled in a mold cavity (not shown). The reassembled part and shape are of a simpler shape than the shape 29, and therefore a standard mold is utilized. The parting agent 33 is disposed between the bored square plate 29 and the core 31. The mold cavity, although not shown, is made of materials such as graphite, tungsten metal, molybdenum metal, and other materials known in the prior art. Graphite of low porosity and high strength is preferred.

The mold cavity into which the compacted shape is introduced is equipped with a pressure applying means and a heating means. The pressure may be applied by a variety of means, however, hydraulic or pneumatic rams are usually preferred because of adjustability and ease of control. The heating means likewise may be one of several well-known in the prior art such as an electrical resistance furnace or a high frequency induction furnace. The pressure from the ram and the heat from the furnace are simultaneously applied to the configuration. The reassembled part and shape are preferably heated to a temperature from about 800° centigrade to about 2,200° centigrade and the pressure applied is preferably from about 1,000 pounds per square inch to about 10,000 per square inch.

The parting agent used in the process of the present invention is a powder that does not fuse with or chemically react with the refractory starting material and is softer in the densified form than the starting material in its densified form. The parting agent used may be worked into the gaps between the final shape and part as a granular powder, preferably it is less than 200 mesh. A liquid or binder similar to those used with the starting material may be added to the parting agent to form a slurry which can be more easily worked into the gaps than a dry grained powder. In the present invention, it has been found that boron nitride is most preferably suited as a parting agent.

After hot pressing the assembled part and shape are released from the mold and the parting agent is removed by sandblasting, scraping it away from the finished piece, or other mechanical or chemical methods.

Figure 4:
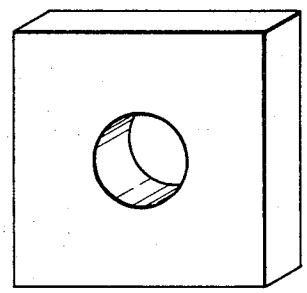
FIG. 4 is a perspective of the final hot pressed part and shape of FIG. 3 with the core removed.
Figure 7:
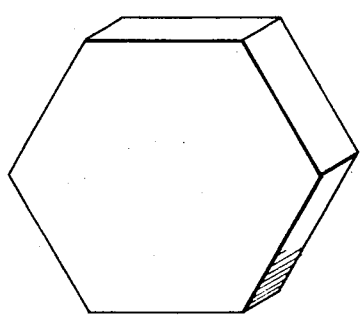
FIG. 7 is a perspective of the final hot pressed hexagon shape of FIG. 6.

Representative final shapes produced by the process of the present invention include the hexagon shown in FIG. 7, and the square plate with the hole shown in FIG. 4, and various other geometric shapes with recesses, notches, pockets, irregular cuts, or wells, shaped therein.

Certain embodiments of the present invention are described in the following specific examples; it being understood that such examples are given for illustrative purposes only and are not limitative. Unless otherwise specified, parts are in parts by weight and degrees in degrees centigrade.

EXAMPLE 1

Boron carbide in the form of a grained powder having a particle size of about 3 microns is mixed with polyvinyl acetate binder to form a mixture having the consistency of wetted sand. To form this mixture about 10 parts of binder solution is used per 100 parts of boron carbide. The mixture is placed in a square steel mold and cold pressed at a pressure of about 300 pounds per square inch. After curing the resulting plate for about one day at about 150° centigrade, the plate or form is core drilled to form a hole in the plate. The plate is then positioned in a square graphite mold of the same shape as the steel mold used in cold pressing. The removed core is placed in the hole so as to form about a 1/16 to about a 1/8 of an inch gap between the plate and the core. A parting agent of boron nitride is mixed with polyvinyl acetate to form a slurry which comprises about 50 parts of boron nitride to about 50 parts of binder solution. The resulting mixture is flowed and puttied into the gap. The resulting assembly or configuration is hot pressed at a temperature of about 1,200° centigrade and at a pressure of about 2,000 pounds per square inch. After cooling the plate, it is sandblasted to remove the core and remove the finished plate having a hole therein.

EXAMPLE 2

In a manner similar to the procedure followed in Example 1, silicon carbide powder is used as a starting material and boron nitride is used as a parting agent to make a finished plate of similar shape.

The particular embodiments of the present invention being described, it is obvious to one of ordinary skill in the art to make various modifications and changes in proportions, temperatures, pressures and operative steps without departing from the spirit and scope of the present invention.

I claim:

1. A method of making a hot pressed refractory product having a desired shape different than the interior shape of the hot press mold comprising mixing a refractory powder with a binder, compressing the refractory powder into a form at a pressure from about 50 pounds per square inch to about 500 pounds per square inch at a temperature below about 500 degrees Centigrade, fabricating said form into a desired shape with the removal of at least one part, reassembling said shape and said part with the distribution of a parting agent therebetween within a mold so as to substantially conform to the configuration of the mold, compressing at a pressure of about 1,000 pounds per square inch to about 10,000 pounds per square inch and heating to a temperature of about 800° Centigrade to about 2,200° Centigrade the desired shape and the part, removing the desired shape and separating it from the part or parts and the parting agent.

2. A process for producing hot pressed shapes in accordance with claim 1 wherein the part and the desired shape are reassembled adjacent each other within said mold.

3. A process for producing hot pressed shapes in accordance with claim 1 wherein said part and said shape are reassembled side by side adjacent each other within said mold.

4. A process for producing hot pressed shapes in accordance with claim 1 wherein said refractory powder is selected from the group consisting of carbides, borides, oxides, nitrides or silicides.

5. A process for producing hot pressed shapes in accordance with claim 1 comprising the additional step of mixing the parting agent with a liquid prior to distribution between said shape and said part.

6. A process for producing hot pressed shapes in accordance with claim 1 wherein the refractory powder is selected from the group consisting of boron carbide and silicon carbide.

7. A process for producing hot pressed shapes in accordance with claim 1 wherein the parting agent is boron nitride.

* * * * *